United States Patent
Jin et al.

(10) Patent No.: US 9,535,215 B2
(45) Date of Patent: Jan. 3, 2017

(54) FLUORINATED SOL-GEL LOW REFRACTIVE INDEX HYBRID OPTICAL CLADDING AND ELECTRO-OPTIC DEVICES MADE THEREFROM

(75) Inventors: Danliang Jin, Bothell, WA (US); Guomin Yu, Bothell, WA (US); Hui Chen, Kirkland, WA (US); Baoquan Chen, Bothell, WA (US)

(73) Assignee: BRPHOTONICS PRODUCTOS OPTOELECTRONICOS LTDA., Sao Paulo (BR)

( * ) Notice: Subject to any disclaimer, the term of this patent is extended or adjusted under 35 U.S.C. 154(b) by 66 days.

(21) Appl. No.: 13/432,973

(22) Filed: Mar. 28, 2012

(65) Prior Publication Data

US 2013/0004137 A1 Jan. 3, 2013

Related U.S. Application Data

(63) Continuation-in-part of application No. 12/559,690, filed on Sep. 15, 2009, now abandoned.

(60) Provisional application No. 61/097,166, filed on Sep. 15, 2008, provisional application No. 61/097,172, filed on Sep. 15, 2008.

(51) Int. Cl.
| | |
|---|---|
| *G02B 6/02* | (2006.01) |
| *G02B 6/13* | (2006.01) |
| *G02F 1/065* | (2006.01) |
| *C08G 77/24* | (2006.01) |
| *G02B 6/12* | (2006.01) |

(52) U.S. Cl.
CPC ............. *G02B 6/13* (2013.01); *C08G 77/24* (2013.01); *G02F 1/065* (2013.01); *G02B 2006/121* (2013.01); *G02F 2202/38* (2013.01)

(58) Field of Classification Search
USPC ............ 528/32, 39, 42; 106/287.13, 287.15; 385/124, 123, 128; 428/447
See application file for complete search history.

(56) References Cited

U.S. PATENT DOCUMENTS

| | | | |
|---|---|---|---|
| 5,580,819 A * | 12/1996 | Li et al. | 427/167 |
| 6,144,795 A * | 11/2000 | Dawes et al. | 385/141 |
| 6,511,615 B1 * | 1/2003 | Dawes et al. | 264/1.21 |
| 6,937,811 B2 | 8/2005 | Bintz et al. | |
| 7,993,707 B2 * | 8/2011 | Nun et al. | 427/387 |
| 2001/0031811 A1 * | 10/2001 | Li et al. | 524/262 |
| 2005/0159574 A1 * | 7/2005 | Jin | 528/42 |
| 2005/0180712 A1 * | 8/2005 | Shelnut et al. | 385/129 |
| 2006/0153993 A1 * | 7/2006 | Schmidt et al. | 427/470 |
| 2007/0297708 A1 * | 12/2007 | Peyghambarian et al. | 385/2 |
| 2008/0118217 A1 * | 5/2008 | Bintz et al. | 385/143 |
| 2009/0238601 A1 * | 9/2009 | Kuroda et al. | 399/111 |
| 2011/0172355 A1 * | 7/2011 | Motoyama et al. | 524/588 |

OTHER PUBLICATIONS

Terrier et al., "Analysis of Antimony Doping in Tin Oxide Thin Films Obtained by the Sol-Gel Method," Journal of Sol-Gel Science and Technology 10 (1997), pp. 75-81.
Kololuoma et al., "Transparent conductive sol-gel thin films for photonic applications," SPIE vol. 3620 (1999), pp. 134-142.
Cao et al., "Influences of dopants on the electronic structure of SnO2 thin films," Department of Chemistry, Tsinghua University, Thin Solid Films 317 (1998); pp. 443-445.
Stjerna et al., "Optical and electrical properties of radio frequency sputtered tin oxide films doped with oxygen vacancies, F, Sb, or Mo," J, Appl. Phys. 76 (6) (1994), pp. 3797-3817.
Grote et al., "Conductive cladding layers for electrode poled non-linear optic polymer electro-optics," Proceeding of SPIE vol. 4114 (2000), pp. 101-109.
Leovich et al., "Optimized Cladding Materials for Nonlinear Optic Polymer Based Devices," Proceedings of SPIE vol. 4652 (2002), pp. 97-103.
Grote et al., "Effect of conductivity and dielectric constant on the modulation voltage for optoelectronic devices based on nonlinear optical polymers," Opt. Eng. 40(11) (2001), pp. 2464-2473.
Grote et al., "Advancements in conductive cladding materials for nonlinear optic polymer based optoelelectronic devices," Proceedings of SPIE vol. 4470 (2001), pp. 10-18.

* cited by examiner

*Primary Examiner* — Margaret Moore
(74) *Attorney, Agent, or Firm* — Hamre, Schumann, Mueller & Larson, P.C.

(57) ABSTRACT

A low index of refraction hybrid optical cladding may be formed from a fluorinated sol-gel. An electro-optic device may include a poled organic chromophore-loaded modulation layer (electro-optic polymer) and at least one adjacent fluorinated hybrid sol-gel cladding layer.

60 Claims, 6 Drawing Sheets

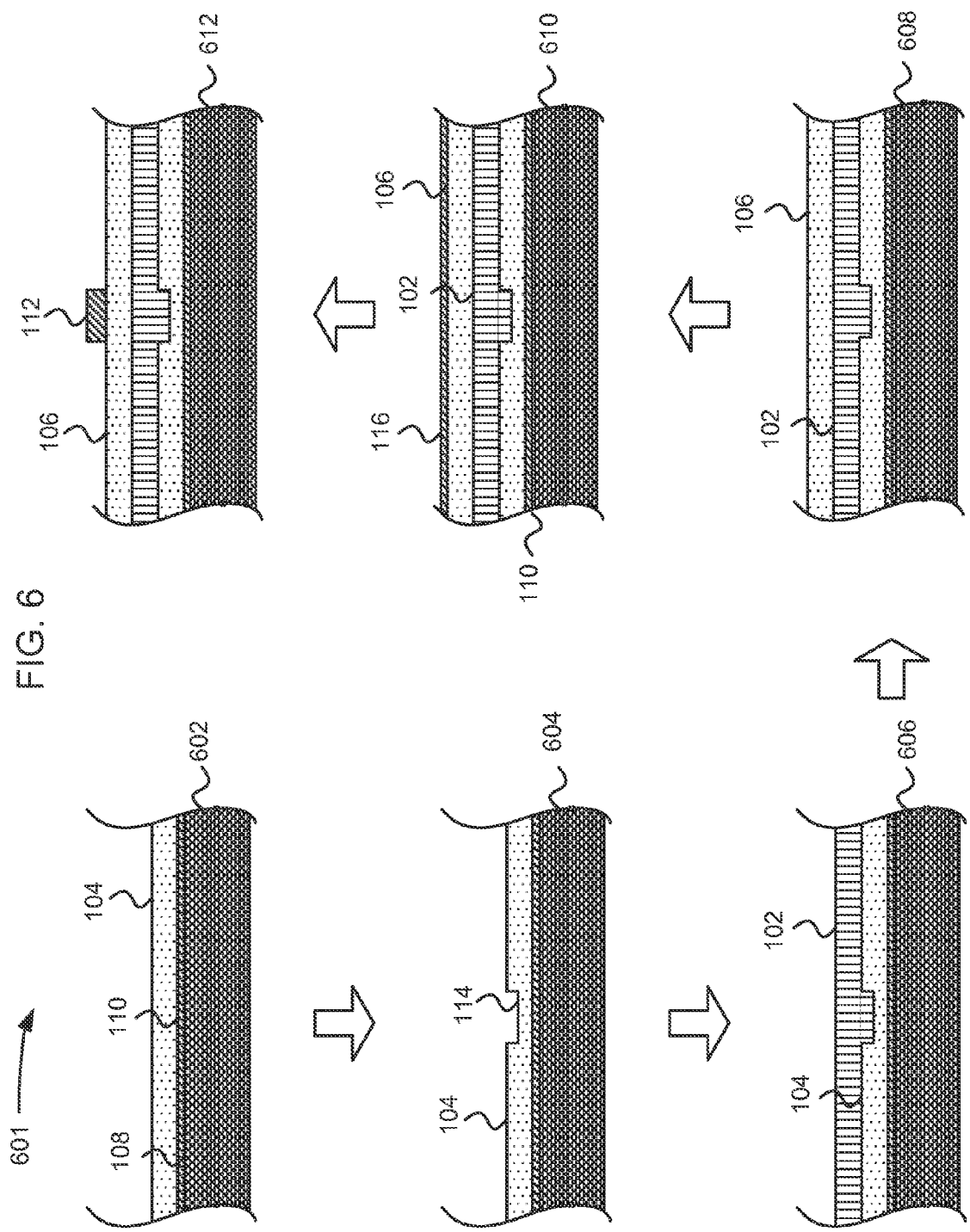

FLUORINATED SOL-GEL LOW REFRACTIVE INDEX HYBRID OPTICAL CLADDING AND ELECTRO-OPTIC DEVICES MADE THEREFROM

CROSS-REFERENCE TO RELATED APPLICATIONS

This application is a Continuation-in-Part from U.S. patent application Ser. No. 12/559,690; filed Sep. 15, 2009; entitled "LOW REFRACTIVE INDEX HYBRID OPTICAL CLADDING AND ELECTRO-OPTIC DEVICES MADE THEREFROM"; invented by Danliang Jin, Guomin Yu, and Hui Chen; copending herewith at the time of filing; which claims priority benefit under 35 U.S.C. §119(e) from U.S. Provisional Patent Application Ser. No. 61/097,166; filed Sep. 15, 2008; entitled "LOW REFRACTIVE INDEX HYBRID OPTICAL CLADDING AND ELECTRO-OPTIC DEVICES MADE THEREFROM"; invented by Danliang Jin, Guomin Yu, and Hui Chen; which also claims priority benefit under 35 U.S.C. §119(e) from U.S. Provisional Patent Application Ser. No. 61/097,172; filed Sep. 15, 2008; entitled "ELECTRO-OPTIC DEVICE AND METHOD FOR MAKING LOW RESISTIVITY HYBRID POLYMER CLADS FOR AN ELECTRO-OPTIC DEVICE"; invented by Danliang Jin, Guomin Yu, Anna Barklund, Hui Chen and Raluca Dinu; each of which is, to the extent not inconsistent with the disclosure herein, incorporated by reference.

STATEMENT REGARDING FEDERALLY SPONSORED RESEARCH OR DEVELOPMENT

The inventions disclosed herein were made with U.S. Government support pursuant to NRO Contract No. NRO000-07-C-0123 and DARPA Contract No. W31P4Q-08-C-0198. Accordingly, the Government may have certain rights in the inventions disclosed herein.

BACKGROUND

Electro-optic devices, and especially poled hyperpolarizable organic chromophore-based electro-optic devices have typically been limited to using hybrid organic-inorganic cladding materials that have a relatively high index of refraction. For example, a crosslinked hybrid organic-inorganic silicon sol-gel may have an index of refraction of 1.45 to 1.47 at a wavelength of 1550 nanometers (nm). Other crosslinked hybrid organic-inorganic sol-gels made from titanate, aluminate, or zirconate precursors have also typically had respective indices of refraction that are substantially determined according to the particular type of sol-gel (i.e. titanium, zirconium, or aluminum-based).

SUMMARY

According to embodiments, a hybrid organic-inorganic optical cladding may include at least one silane monomer, at least one organically modified trialkoxysilane monomer including an organic cross-linking group, and at least one fluorinated silane monomer. The fluorinated group may reduce the index of refraction of the cladding.

According to embodiments, a hybrid organic-inorganic optical cladding may include covalently bound fluorinated groups that reduce the index of refraction of the cladding to below 1.45. According to embodiments, the index of refraction may be between about 1.35 and 1.44.

According to embodiments, an electro-optic device may include a hybrid organic-inorganic cladding including at least one silane monomer, at least one organically modified trialkoxysilane monomer including an organic cross-linking group, and at least one fluorinated silane monomer. The fluorinated silane monomer may include covalently bound fluorine or a fluorinated organic group. The fluorine or fluorinated group may reduce the index of refraction of the cladding.

According to embodiments, an electro-optic device may include silicon sol-gel cladding having covalently bound fluorinated groups that reduce the index of refraction of the cladding to below 1.45. According to embodiments, the index of refraction may be between about 1.35 and 1.44. The electro-optic device may include an electro-optic core having poled chromophores in a polymer matrix. The polymer matrix of the core may also include silicon sol-gel cladding having covalently bound fluorinated groups.

BRIEF DESCRIPTION OF THE DRAWINGS

FIG. 6 is a diagram illustrating a device at several steps of fabrication, according to an embodiment.

DETAILED DESCRIPTION

Figure 1:
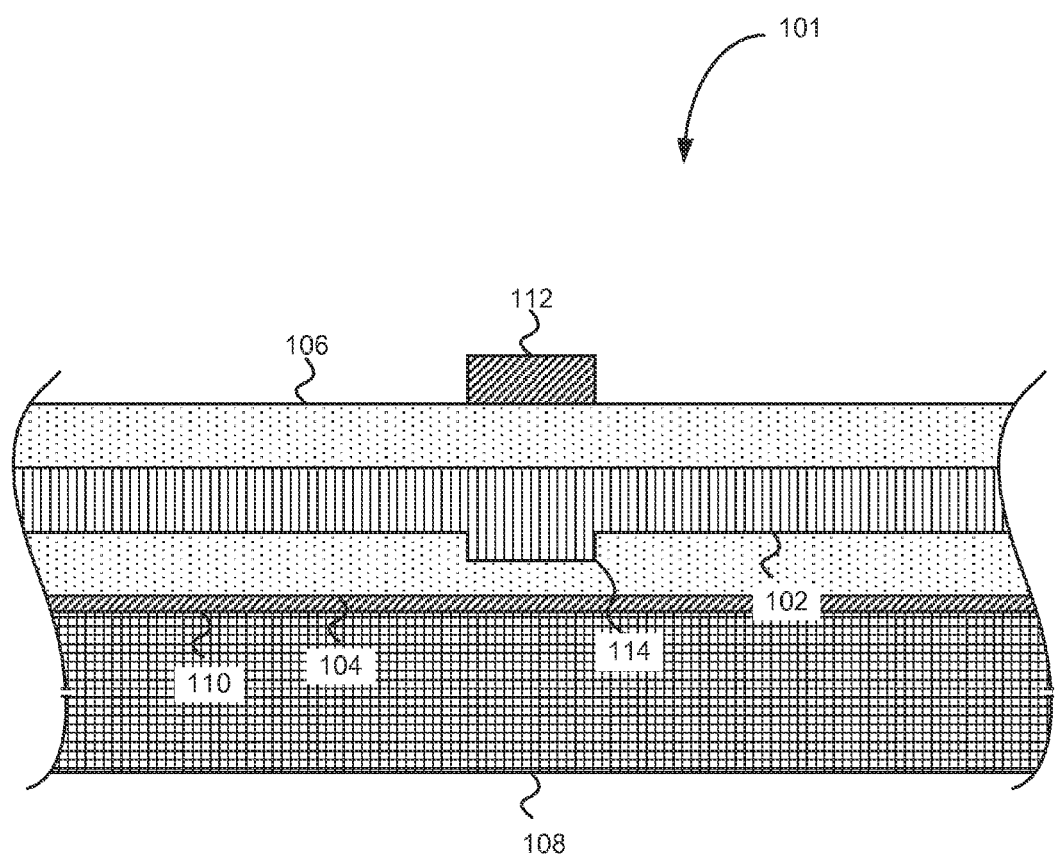
FIG. 1 is a cross-sectional diagram of an electro-optic device, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a cross-sectional diagram of an electro-optic device 101, according to an embodiment. The electro-optic device 101 includes an electro-optic core 102 disposed between optical clads 104 and 106. The electro-optic device 101 may be formed over a substrate 108 such as silicon, silicon-on-insulator, glass, or other semiconducting or insulating wafer. Two electrodes 110, 112 are arranged to apply a modulation voltage across the electro-optic core 102 through the claddings 104, 106. One or more light guiding structures 114, such as a trench waveguide, etc. may be provided to guide light transmitted through the electro-optic core 102 for modulation.

The electro-optic core 102 may include at least one type of hyperpolarizable organic chromophore and one or more polymers, such as a cross-linked polymer. The at least one hyperpolarizable organic chromophore and the polymer may form a guest-host material. Alternatively, the hyperpolarizable organic chromophore may be covalently bound to the polymer, or may be otherwise held in the polymer. The polymer in the electro-optic core 102 may include an organic polymer, such as amorphous polycarbonate for example, or may include a hybrid material such as a sol-gel. The electro-optic core material may be referred to as an electro-optic polymer.

Typically, the electro-optic core material is poled, ideally to substantially align the chromophores. The core may be poled by applying a poling voltage from a poling electrode across the electro-optic core 102 through some or all of the cladding 106, 104 thickness while the device 101 is heated to near a glass transition temperature, Tg, of the electro-optic polymer in the core 102. After the chromophores are aligned, the device 101 is cooled to "lock" the chromophores into their poled orientations. The poling electrode may include a temporary electrode that is removed after poling (not shown). Alternatively, a modulation electrode 112 may be used as a poling electrode.

According to embodiments, the optical index of refraction or refractive index of the material in at least one of the optical clads 104, 106 is lower than the index of refraction of previous polymer cladding materials and especially of previous hybrid organic-inorganic polymer cladding materials, such as organic-inogranic sol-gel hybrids, which may typically have an index of refraction of 1.45 to 1.47 at 1550 nm. For example, the optical clads 104, 106 may have indices of refraction of about 1.35 or lower to just below the 1.45 to 1.47 index of previous materials. According to another embodiment, the optical clads 104, 106 may have indices of refraction between 1.39 or lower to just below 1.45. According to another embodiment, the optical clads 104, 106 may have indices of refraction of between 1.391 and 1.404.

The reduced index of refraction may be used to increase index contrast between the electro-optic core 102 and one or both of the clads 104, 106. Alternatively or additionally, the reduced index of refraction of at least one clad 104, 106 may allow modifications to the electro-optic core 102, such as to decrease the index of refraction of the electro-optic core 102, increase the size of the electro-optic core 102 while maintaining numerical aperture, etc.

According to embodiments, fluorinated organically modified sol-gel precursors including silicon, titanium, zirconium, aluminum, and/or boron may be combined with non-fluorinated organically modified sol-gel precursors including silicon, titanium, zirconium, aluminum, and/or boron and non-organically modified hydrolysable precursors including silicon, titanium, zirconium, aluminum, and/or boron to produce a hybrid fluorinated sol-gel optical cladding having a selected index of refraction.

Figure 2:
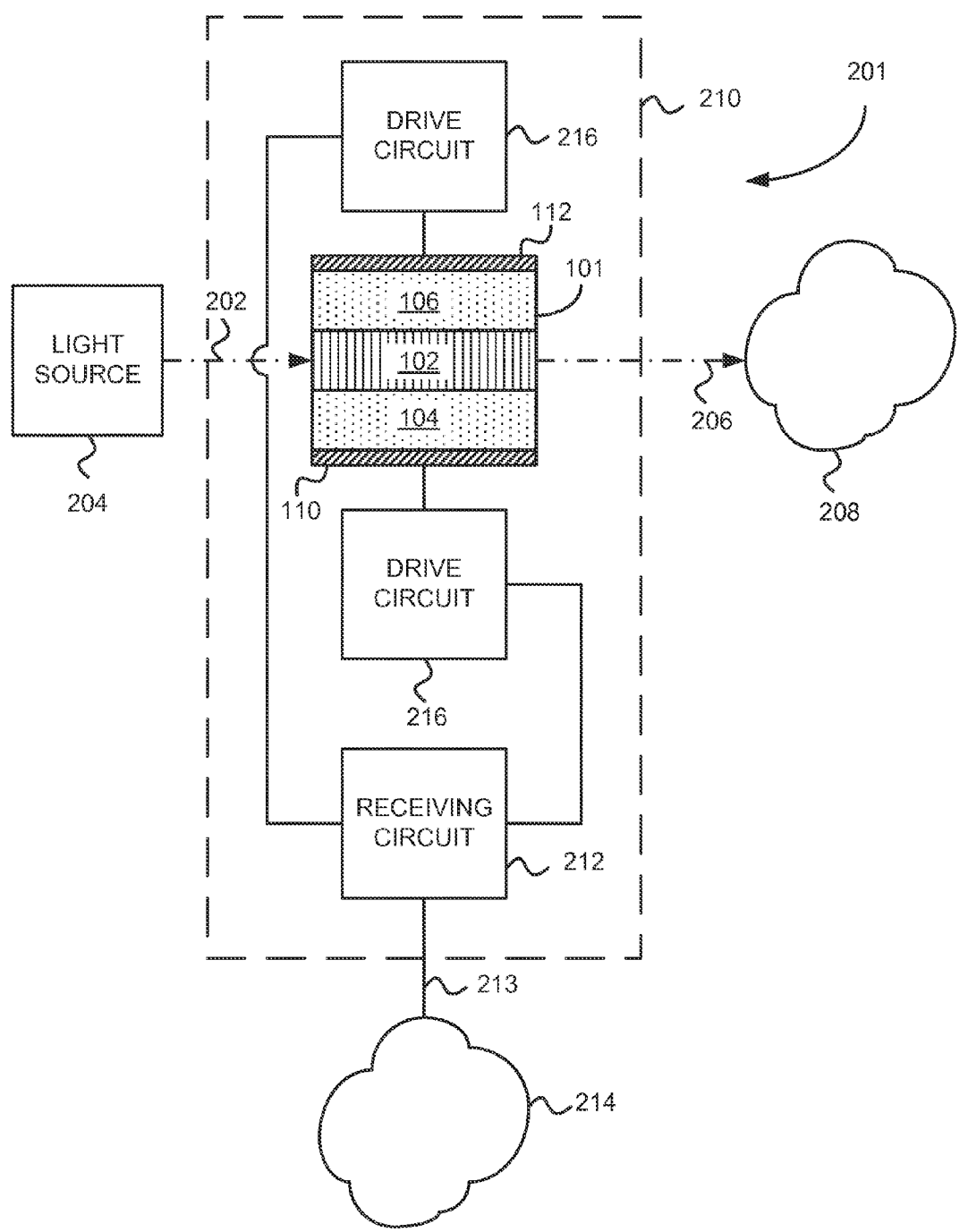
FIG. 2 is a simplified diagram of system including an electro-optic device of FIG. 1, according to an embodiment.

FIG. 2 is a simplified diagram of system 201 including an electro-optic device 101, according to an embodiment. In operation, light 202 such as laser light from a laser 204 at an infrared wavelength may be passed through the electro-optic core 102. To provide light guidance and minimize optical losses, the optical clads 104, 106 typically have indices of refraction that are lower than the index of refraction of the electro-optic core 102. For example, according to an embodiment, the nominal index of refraction of the electro-optic core 102 may be about 1.5 to 1.8 and the index of refraction of the clads 104, 106 may be less than 1.45 to 1.47. According to another embodiment, the nominal index of refraction of the electro-optic core 102 may be less than about 1.5-1.8 and the index of refraction of the clads 104, 106 may be less than about 1.45-1.47. According to another embodiment, the index of refraction of the clads 104, 106 may be about 1.35 to about 1.4.

During operation, one electrode 110 may be held at ground while the other electrode 112 is voltage modulated. In some applications, the electrode 112 may be a top electrode that is provided in the form of a high speed strip electrode configured to propagate modulation pulses along its length, parallel to and preferably at least somewhat velocity-matched to the propagation of light through the electro-optic core 102. The poled hyperpolarizable chromophore in the electro-optic core 102 responds to the modulation voltage with a corresponding change in refractive index, which operates to modulate the phase of the propagated light 202. A device may be used to provide a phase-modulated light signal 206 for transmission through a network 208. Alternatively, a device, such as in a Mach-Zehnder modulator, may include plural optical channels, each modulating a portion of coherent light, which when the light is rejoined may destructively or constructively interfere to provide an amplitude-modulated light signal 206 for transmission.

According to embodiments, the electro-optic device 101 may be combined with other components in an integrated device 210. Such components may include a receiving circuit 212 configured to receive one or more signals along an input signal transmission path 213 from a network 214 or other signal source, and drive electronics 216 configured to provide the drive signal to the electrodes 110, 112.

According to embodiments, the bottom clad 104 may be about 1-2 microns thick below the waveguide 114 and/or about 2-2.4 microns thick without the trench waveguide 114 or at locations not corresponding to a trench waveguide 114. The electro-optic core 102 may be about 3 microns thick including a trench waveguide 114 and/or about 2 microns thick without the trench waveguide 114 or at locations not corresponding to the trench waveguide 114. The top clad may be about 0.5 to 2.0 microns thick.

Referring again to FIG. 1, the low index of refraction material in the cladding layers 104, 106 includes a hybrid organic-inorganic material. The hybrid organic-inorganic material may be referred to as a hybrid sol-gel material. The hybrid sol-gel material may be formed from a silane monomer, an organically modified trialkoxysilane monomer including an organic cross-linking group, and a fluorinated silane monomer. These monomers are respectively structurally depicted below.

For example, the hybrid sol-gel material may be gelled and crosslinked from a mix of monomers having the structures:

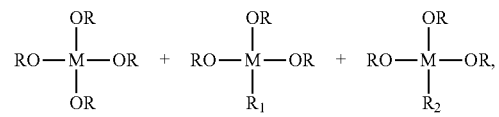

in the mole ratio $n_1:n_2:n_3$, respectively;
where:
M is Si, Ti, Al, Zr, or B;
R is a hydrolysable group;
$R_1$ is an organic crosslinker;
$R_2$ is a fluorinated organic group or fluorine;
$(n_1+n_2)>n_3$; and
$n_1$, $n_2$, and $n_3$ are all greater than zero. The coefficients $n_1$, $n_2$, and $n_3$ may be modified to provide selected mechanical, electrical, and/or optical properties. According to an embodiment, $n_1$ is about 4, $n_2$ is 1, and $n_3$ is about 2 (with the constraint that each coefficient is greater than zero), as shown by the example "LIP1" shown in Table 1, below. According to another embodiment, $n_1$ is about 2, $n_2$ is 1, and $n_3$ is about 2 (with the constraint that each coefficient is greater than zero), as shown by the example "LIP2" shown in Table 1, below. According to another embodiment (not shown in Table 1), $n_1$ is about 2, $n_2$ is 1, and $n_3$ is about 1 (with the constraint that each coefficient is greater than zero).

The dominant chemical structure of the hybrid sol-gel after curing may be expressed as:

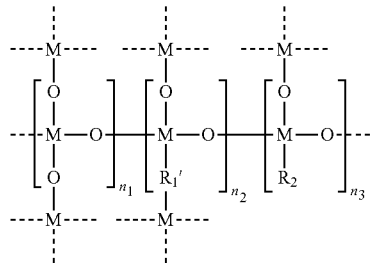

where M is Si, Ti, Al, Zr, or B;

$R_1'$ is an organic crosslinkage formed from the organic crosslinker $R_1$;

$R_2$ is a fluorinated organic group or fluorine; and $n_1$, $n_2$, and $n_3$ are as described above.

The structure presented above is necessarily simplified to represent typical elements and bond types.

The actual physical structure of a cured clad 104, 106 is typically a three-dimensional network of M's linked in an amorphous gel by a combination of M-O-M and M-$R_1'$-M linkages with a small amount of unreacted pendent (unlinked) R and $R_1$ groups (e.g., in a trace amount), a small amount of —OH groups, that are not reacted to form M-O-M linkage, and pendent $R_2$ groups. This may be depicted in still a simplified manner as:

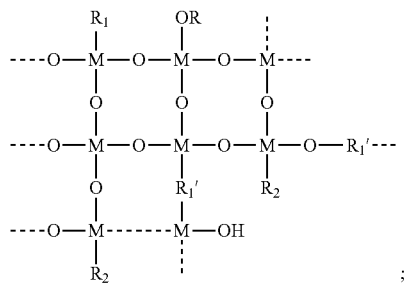

wherein

—OR indicates a small amount of residual unreacted alkoxy groups, and non-terminated bonds indicate extension to an extended matrix similar to the structure shown.

RO— may be a hydrolysable alkoxy group such as —$OCH_3$ or —$OCH_2CH_3$, —$OCH(CH_3)_2$, —$O(CH_2)_n$—$CH_3$ where n is two or more, or in hydrolyzed form, —OH. The M-O— backbone may link or gel to form silanate, titanate, aluminate, zirconate, or boronate (M-O-M) bonds through displacement of the hydrolysable groups (e.g. after being fully condensed).

$R_1'$ is the linkage moiety generated from $R_1$, which is a reactive organic crosslinker such as (before crosslinking) an epoxy:

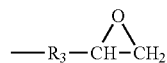

(e.g. glycidyl propyl ether), or an acrylate (before crosslinking):

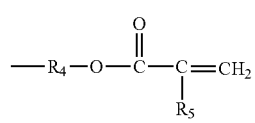

where $R_3$, $R_4$, and $R_5$ are alkyl or aromatic groups.

In the case of glycidyl, the organic crosslinker $R_1$ may link the M backbone to form an organo-metallic (M-$R_1'$-M) linkage. Thus, the sol-gel includes both -M-O-M- and -M-$R_1'$-M- linkages to form networks. The M-O-M linkage is a very close linkage with large number density that may tend to make the material brittle. The inclusion of M-$R_1'$-M linkages may significantly improve the toughness of the material and make it more easily processed and suitable for use as an optical cladding.

In case of an acryl crosslinker, the organic crosslinker $R_1$ may link each other to form a polyacrylate-type organic linkage. Thus, the sol-gel includes both -M-O-M- and —C—C—C—C— linkages to form networks as depicted:

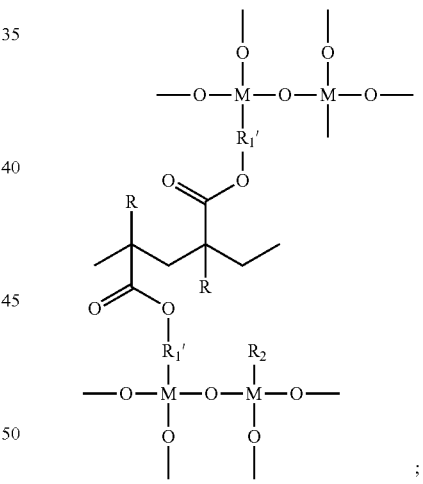

where R can be a methyl group or proton, $R_1'$ is aliphatic linkage, and M is Si, Ti, Al, Zr, or B.

$R_2$ is a fluorinated organic group or fluorine that is pendent on the M backbone. For example, $R_2$ may be a partially or substantially fully fluorinated alkyl or aryl group. According to embodiments, $R_2$ may include fluorine, —F; a 1H,1H,2H,2H-tetrahydro-perfluorododecyl group, —$CH_2$—$CH_2$—$CF_2$—$CF_2$—$CF_2$—$CF_2$—$CF_2$—$CF_2$—$CF_2$—$CF_2$—$CF_2$—$CF_3$; a tridecafluoro-1,1,2,2-tetrahydrooctyl group, —$CH_2$—$CH_2$—$CF_2$—$CF_2$—$CF_2$—$CF_2$—$CF_2$—$CF_3$; a pentafluorobenzyl group,

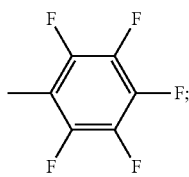

or other highly or partially fluorinated group. The fluorinated group $R_2$ tends to reduce the index of refraction of the organic-inorganic hybrid cladding materials. Generally, a larger proportion of fluorinated groups within the hybrid materials composition may provide a greater reduction in index of refraction. The fluorinated groups $R_2$ listed above are selected based on their relatively wide commercial availability. Other fluorinated groups may be substituted as desired.

The stoichiometry of the groups

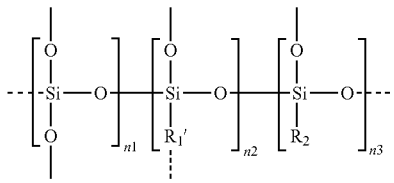

may be varied according to device design considerations, cost, etc. For example, larger values of n1 may tend to make the cladding 104, 106 relatively hard but also relatively brittle. Larger values of n2 may tend to make the cladding 104, 106 tougher. Larger values of n3 tend to reduce the index of refraction. According to one embodiment where M was 100% Si, $R_2$ was $(CH_2)_2(CF_2)_5CF_3$, and n1=2, n2=1, and n3=1; an optical cladding 104, 106 was produced having an index of refraction measured as 1.397 at 1550 nm. A comparison of two compositions, LIP1 and LIP2 with differing n1, n2, and n3 values is presented in table 1 below:

(with no fluorinated groups $R_2$) may have an index of refraction of about 1.8, while a cladding 104, 106 with the formula:

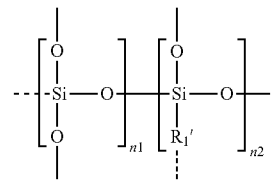

(also with no fluorinated groups $R_2$) may have an index of refraction of about 1.45 to 1.47. Mixing titania and silane precursors to form a hybrid sol-gel having the formula:

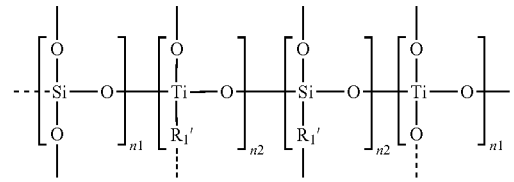

(with no fluorinated groups $R_2$) may provide an approximate index of refraction equal to the average of the Ti- and Si-based sol-gels: $((1.45)+(1.8))/2=1.625$. Similarly, combining monomers having Si, Ti, Al, Zr, and/or B as M in different ratios will generally produce a weighted average of the individual indices of refraction.

Adding fluorinated groups decreases the index of refraction, and may allow the designer an extra degree of freedom with respect to the properties of the cladding 104, 106.

TABLE 1

| | n1 (calculated from feeding monomer of tetraethoxysilane) (mole) | n2 (calculated from feeding monomer of 3-glycidoxypropyltri-methoxysilane) (mole) | n3 (calculated from feeding monomer of tridecafluorotetrahydro-octyltriethoxysilane) (mole) | Refractive Index measured at wavelength of 1550 nm |
|---|---|---|---|---|
| LIP1 | 0.48 | 0.12 | 0.24 | 1.3940 |
| LIP2 | 0.20 | 0.10 | 0.20 | 1.4040 |

For low index of refraction optical clads 104, 106, using Si as M provides the lowest starting index of the group Si, Ti, Al, Zr, B, and may thus provide the lowest index of refraction. Fluorinated groups $R_2$ may alternatively be added to non-silicon sol-gels or partially non-silicon sol-gels to tune the index of refraction and/or to tune the dielectric constant. Adding fluorinated groups $R_2$ generally decrease the dielectric constant of the optical cladding 104, 106. Sol-gels produced from combinations of M's, for example Si and Ti, may be used to provide indices of refraction between the two materials when used alone.

For example a cladding 104, 106 with the formula:

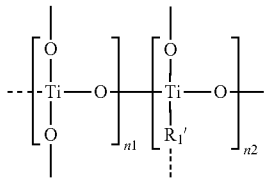

To reduce the electrical resistivity, the hybrid organic-inorganic cladding material may be doped with an inorganic or organic salt. The concentration of the salt may be at a concentration equal to or less than about 5%, for example. According to an embodiment, the cladding is doped with an inorganic salt of lithium, sodium, or potassium etc. at a concentration equal to or less than about 2%. According to an embodiment, the cladding is doped with lithium perchlorate at a concentration of between about 1% and 3%. According to an embodiment, the cladding may be doped with lithium perchlorate at a concentration of about 2%.

Figure 3:
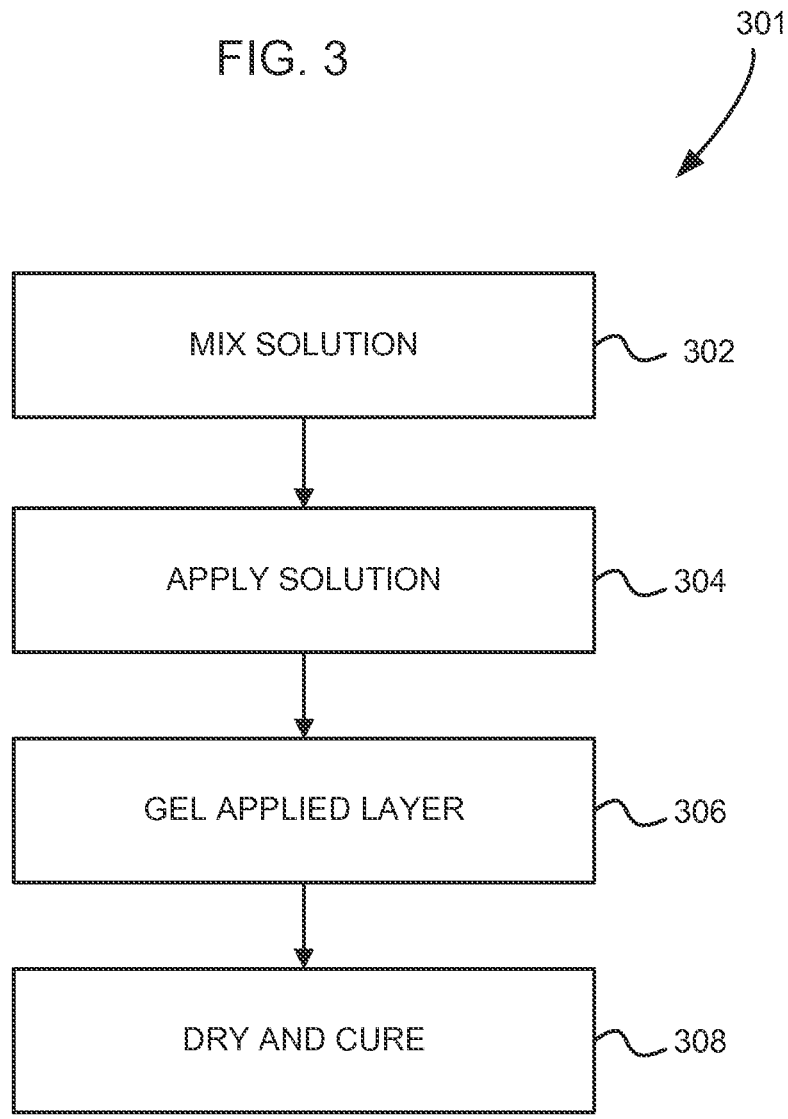
FIG. 3 is a flow chart showing a method for making a hybrid organic-inorganic optical cladding according to an embodiment.

FIG. 3 is a flow chart showing a method 301 for making a hybrid organic-inorganic optical cladding according to an embodiment. In step 302, a sol-gel solution including a sol-gel precursor:

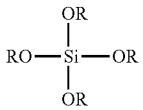

and organically modified silane precursors:

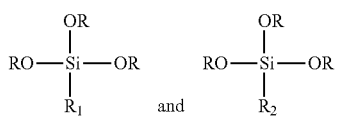

is mixed in solution. As described above,
R is a hydrolizable group;
$R_1$ is an organic crosslinker; and
$R_2$ is a fluorinated organic group or fluorine.

According to embodiments, the silicone precursor and organically-modified silicone precursors may be mixed in a solution at a wide range of molar ratios. For example, embodiments of low index sol-gels that were synthesized and whose indices of refraction were measured include molar ratios of about 2:1:1, 2:1:2, and 4:1:2 silane precursor: cross-linker modified precursor:fluorination modified precursor.

Specific embodiments may be made by reference to the following examples:

Example 1

LIP3

1. To a 1 liter round bottom flask, 49.92 gram (0.24 mol) of tetraethoxysilane, 56.76 gram (0.24 mol) of 3-glycidoxypropyltrimethoxysilane, 91.87 gram (0.18 mol) of tridecafluoro-1,1,2,2-tetrahydrooctyltriethoxysilane, and 179 gram of ethanol were charged with magnetic stirring.
2. Mixed 50.88 gram of H2O and 9.8 gram of 2M HCl.
3. Slowly dropped the acid into the round bottom flask and stirred until the solution became clear.
4. The flask was equipped with condenser and purged with nitrogen and immersed in a oil bath. The solution was maintained refluxing for four hours. The solution was then cooled to room temperature.
5. 1.60 gram of aluminum acetylacetonate was added into the solution while stirring. The solid dissolved slowly and a clear solution was obtained.
6. The solution was aged overnight. The solution was then ready for thin film deposition.

Example 2

LIP1

Preparation of a Fluorinated Sol-Gel

A fluorinated sol-gel was prepared by adding 99.96 g (0.48 mol) of tetraethoxysilane, 236.3 g (0.12 mol) of 3-glycidoxypropyltrimethoxysilane, 122.40 g (0.24 mol) of tridecafluorotetrahydrooctyltriethoxysilane, and 312 g of isopropyl alcohol to a 1 L round bottom flask. The resulting mixture was stirred and a solution of 4.32 g of 2M DCl in 60 g of D2O was added dropwise slowly until the mixture became clear. The resulting solution was refluxed for 3 h then allowed to cool to room temperature overnight. The isopropyl alcohol and other volatile reaction products were removed under reduced pressure. The resulting solution was diluted with 200 g of n-butanol, 40 g of cyclopentanone, and stored in 0° C. refrigerator.

Proceeding to step 304, the solution is applied to a surface. For example, the solution may be spin-coated or sprayed onto a substrate such as a silicon, glass, or silicon-on-insulator wafer. The substrate may include one or a plurality of bottom electrodes (FIG. 1, 110).

For example, following steps 1-6 from Example 1 above, the next step is

7. The solution was spin-coated onto a silicon wafer having a plated or sputtered gold conductor at 1000 rpm and cured on a hot plate at 150° C. for 1 hr. The film thickness was 2.0-2.2 mm. The refractive index was about 1.397 at a wavelength of 1550 nm.

Next, in step 306, the applied layer is cured thermally or via an ultraviolet and thermal process. A backbone molecular structure for the cured material may be expressed as:

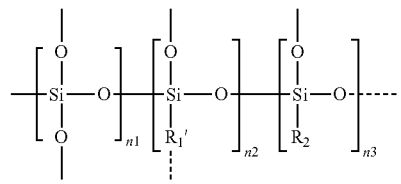

where $R_1$ is an organic linkage such as:

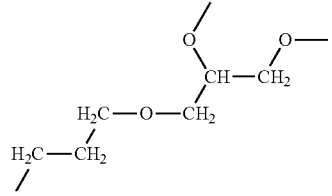

$R_2$ is a fluorinated organic group, such as:
—$(CH_2)_2(CF_2)_5CF_3$;
n1=2;
n2=1; and
n3=1.

There are two types of gelling or crosslinking mechanisms. One is from the inorganic backbone (≡Si—O—Si≡) and the other is from the organic crosslinker (≡Si—$R_1$'—Si≡). The combination of crosslink types provides for the excellent mechanical and optical properties provided by the hybrid sol-gel cladding materials.

Proceeding to step 308, the gelled material is further condensed and deeply cured to form a solid film, which in turn forms the optical cladding. For example the film may be cured by placing the substrate on a hot plate at 150° C. or higher for 1 hr.

Figure 4:
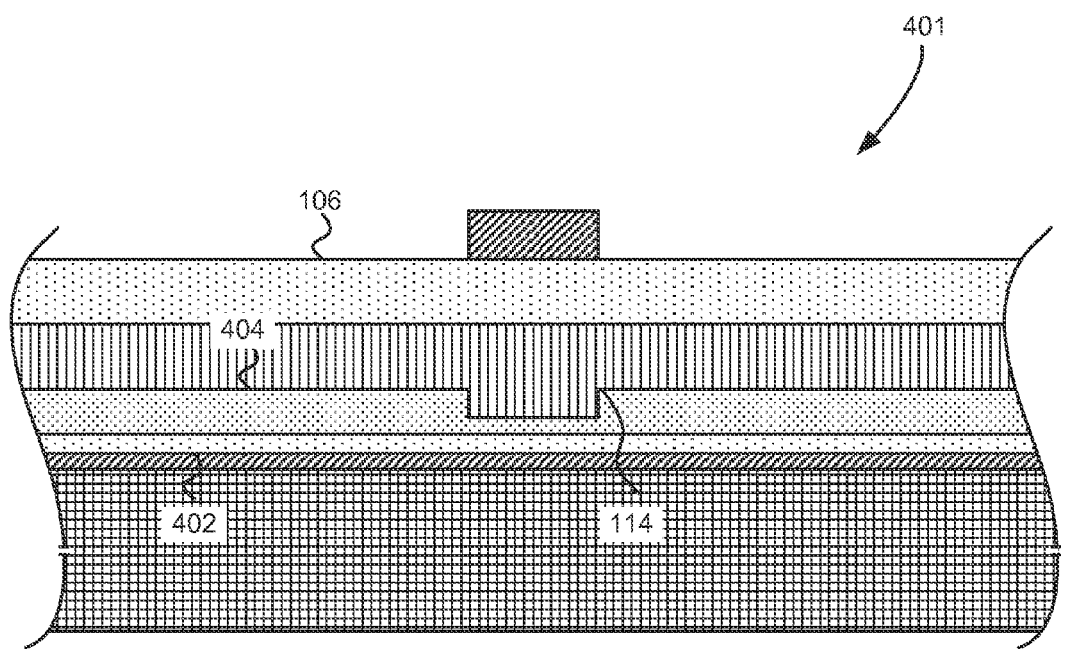
FIG. 4 is a cross-sectional diagram of an electro-optic device structure, according to an embodiment.

FIG. 4 is a cross-sectional diagram of an alternative device structure 401, according to an embodiment. In some embodiments, it may be advantageous to combine the low index of refraction hybrid organic-inorganic cladding layers with one or more other cladding layers formed from more conventional materials. For example, a bottom cladding layer may include a first cladding layer 402 made with a low index of refraction hybrid organic-inorganic material described herein. The bottom cladding may also include another cladding layer 404. For example, the additional cladding layer 404 may include a higher index of refraction material such as a UV-cured polymer, a cross-linked polymer, a non-fluorinated sol-gel, or another conventional cladding material. The upper cladding layer 106 may be formed from a low index of refraction hybrid organic-inorganic material as described above, or may be made of an alternative material such as a UV-cured polymer, a cross-linked polymer, a non-fluorinated sol-gel, or another conventional cladding material.

One attribute of the device structure may be that the etching process used to form the waveguide structure 114 may be performed on an alternative material. Etching an alternative material may be advantageous in some embodiments for process considerations.

Figure 5:
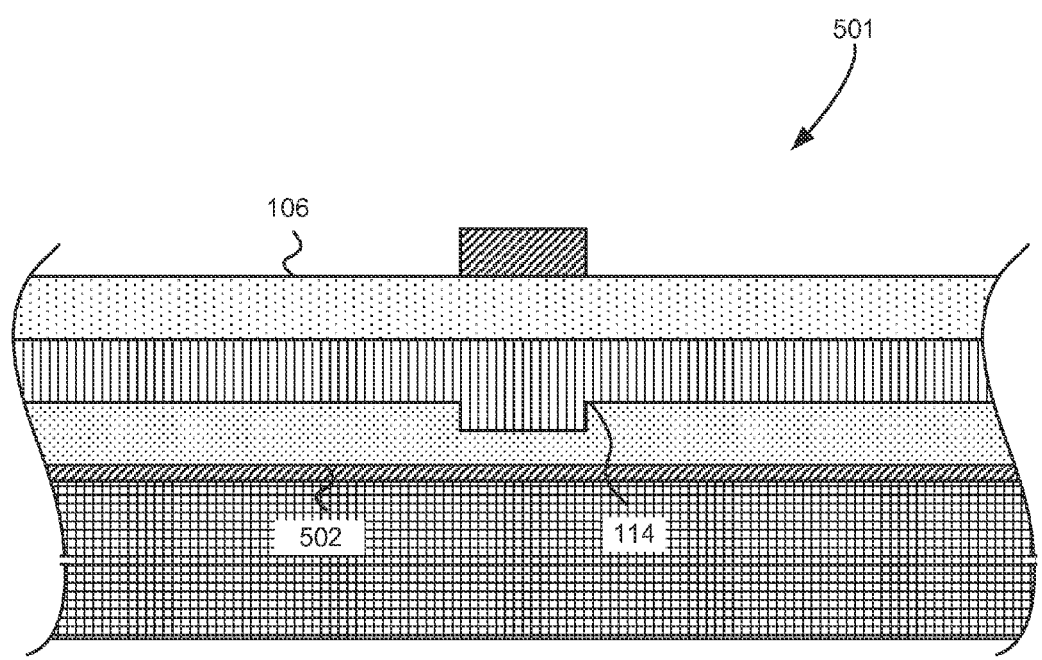
FIG. 5 is a cross-sectional diagram of an electro-optic device structure, according to another embodiment.

FIG. 5 is a cross-sectional diagram of another alternative device structure 501, according to an embodiment. The optical device may include a Mach-Zehnder modulator, a phase modulator, an optical multiplexer, and optical demultiplexer, or a ring modulator, for example. In the embodiment of FIG. 5, the bottom low index of refraction hybrid organic-inorganic cladding layer 104 is substituted with another type of cladding 502. The device 501 uses a bottom clad 502 with dry-etched trench waveguide 114 formed from UV15LV, a conventional ultraviolet-cured cross-linked polymer. The top-cladding 106 is formed from a low index of refraction hybrid organic-inorganic material taught herein.

FIG. 6 is a diagram 601 illustrating a device 101 at several steps of fabrication 602 to 612, according to an embodiment. First, as shown at step 602, a bottom cladding layer 104 is deposited over a substrate 108 and bottom electrode 110. The bottom cladding layer may be a low index of refraction hybrid organic-inorganic material as described elsewhere herein. Alternatively, a bottom cladding layer may be formed as a composite with a first cladding layer (see 402 in FIG. 4) made with a low index of refraction hybrid organic-inorganic material described herein and another cladding layer (see 404 in FIG. 4). For example, the additional cladding layer may include a relatively high index of refraction material such as a UV-cured polymer, a cross-linked polymer, a non-fluorinated hybrid sol-gel, or another conventional cladding material.

Forming the monomer mixture described above may include adding the monomers sequentially or simultaneously to a solvent or adding the solvent to one or more of the monomers. The solvent may include water. The monomer mixture may be added to a catalyst or the catalyst may be added to the monomer mixture. The monomer mixture or partially gelled monomer mixture may be filtered before application to the wafer to substantially prevent lumps or a catalyst from being applied to the wafer surface.

The bottom cladding layer 104 may be deposited as a low index of refraction sol-gel solution, as described above. For example, the bottom cladding layer may be deposited by spraying or spin-coating. Then, the bottom cladding may be dried and cured to form a solid film. For example, the wafer may be kept at about 100° C. to 200° C. for a period of time sufficient to provide the desired mechanical properties. For example, the temperature may be maintained for between 30 minutes and 10 hours. There has not been any detrimental effect found arising from 10 hour or longer dry and cure times. To further elaborate, the bottom cladding layer may include applying the monomer mixture described above, a hydrolyzed monomer mixture, and/or a partially gelled monomer mixture over a semiconductor, glass, or semiconductor-on-glass wafer. A sol-gel solution here means a fluid which does not contain precipitations, solids, suspension chunks, swell lumps, or homogenous fluid; and where any solid mass from reaction has been removed by filtration or separated by centrifugation.

Gelling and crosslinking the monomer mixture may include applying heat, spin drying, or vacuum evaporation to drive off at least a portion of the solvent; and applying heat, ultraviolet radiation, or heat and ultraviolet radiation to perform, increase, or complete the crosslinking and gelling to form a mechanically tough, optically transparent optical cladding having a thickness between 10 nanometers and 100 micrometers. Similarly, forming a top cladding may include applying the monomer mixture or a partially gelled monomer mixture over an electro-optic polymer which was previously formed over a semiconductor, glass, or semiconductor-on-glass wafer. In each case, applying the monomer mixture or partially gelled monomer mixture may include spin coating, spraying, or dipping.

In step 604, a waveguide structure 114 may be formed in the bottom clad 104. Generally, the waveguide structure 114 is formed parallel and below a top electrode. Etching may be performed by a number of methods. For example, plasma etching such as reactive ion etching or deep reactive ion etching may be used to form a trench waveguide 114, and may be advantageous for forming smooth and vertical trench sides.

Proceeding to step 606, a core material 102 comprising an electro-optic polymer including hyperpolarizable (aka nonlinear) chromophores is deposited over the bottom cladding 104, for example by spin-coating or spraying. If the core material includes a polymer material such as an amorphous polycarbonate, the core 102 may be applied from solution during spinning or spraying, and then baked at elevated temperature to remove the solvent. Optionally, the core material may be reheated to reflow the top surface of the core 102 flat. If the core material includes a hybrid organic-inorganic material such as those described herein, the core may be dried and cured similar to the method described in conjunction with step 604 above. The electro-optic core 102 may optionally also include a low index of refraction hybrid organic-inorganic polymer.

Proceeding to step 608, a top cladding 106 is applied over the electro-optic material layer 102. Preparation, application, drying, and curing of the low index of refraction hybrid organic-inorganic material may be done as described above. Alternatively, the top cladding 106 may include another material such as a UV-cured polymer, UV-cured fluorinated sol-gel materials, a cross-linked polymer, a non-fluorinated sol-gel, or another conventional cladding material.

Proceeding to step 610, a poling electrode 116 may be formed over the upper cladding layer 106, and the electro-optic core 102 poled to align the chromophores as described above. The top electrode 112/116 shown in FIG. 1 may be configured as a modulation electrode and/or as a poling electrode. In some embodiments, such as that illustrated by FIG. 6, the poling electrode 116 may be removed after poling and a high speed electrode formed.

During step 610, the poling electrode 116 may be formed, for example by sputtering or solution plating over the top cladding 106. During poling, the core material 102 is brought up to near its glass transition temperature. Generally, it may be preferable for the temperature to be within ±10° C. of the glass transition temperature of the cross-linking core polymer. The elevated temperature makes it easier for the polar chromophore molecules to rotate to a parallel orientation responsive to the applied poling voltage.

Then, a poling circuit applies a poling voltage to the poling electrode and maintains the bottom electrode 110 at ground. The poling voltage may typically be up to about 900 to 1000 volts, depending on the device configuration. Typically, the poling voltage is maintained for about one to three minutes while the temperature is maintained, then the temperature is allowed to drop. The poling voltage is removed, typically shortly after the temperature reaches room temperature. The reduction in temperature causes the core polymer to drop below its glass transition temperature, which tends to immobilize the chromophores in the poled orientation.

According to alternative embodiments, the modulation electrode 112 may be used as a poling electrode 116. However, the process 601 shows a more conventional approach where separate poling 116 and modulation 112 electrodes are used.

Proceeding to step 612, the poling electrode 116 is stripped off the top of the top cladding 106. Optionally, an additional thickness of top cladding material may be deposited over the stripped top cladding 106. Then, a modulation electrode 112 is formed. The modulation electrode 112 is typically configured as a high speed (aka RF) strip electrode configured to conduct modulation signals at very high modulation bandwidths corresponding to optical signal transmission bandwidths. Typically, trace and electrode layouts take propagation delay and signal termination into account to maximize the transmission of in-phase, clean signals while minimizing reflections, impedence, and other deleterious effects.

Taken together, the bottom cladding, the electro-optic core (also referred to as the optical polymer, and the top cladding described herein may be referred to as an optical polymer stack.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:
1. A method for making an optical cladding, comprising:
forming a monomer mixture including

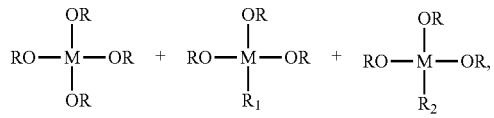

in the molar ratio $n_1:n_2:n_3$, respectively,
where:
M is Si, Ti, Al, Zr, or B,
OR is a hydrolysable group,
$R_1$ is an organic crosslinker,
$R_2$ is a fluorinated organic group or fluorine, and
$n_1$, $n_2$, and $n_3$ are each between 1 and 10;
applying the monomer mixture to be disposed adjacent to an electro-optic polymer layer including a poled chromophore;
exposing the monomer mixture to hydrolysis conditions; and
gelling and crosslinking the monomer mixture to form an optical cladding layer adjacent to the electro-optic polymer layer;
wherein the optical cladding layer does not include the poled chromophore.

2. The method for making an optical cladding of claim 1, wherein M is Si.

3. The method for making an optical cladding of claim 1, wherein $(n_1+n_2)>n_3$.

4. The method for making an optical cladding of claim 1, wherein $n_1$ is about 4, $n_2$ is 1, and $n_3$ is about 2.

5. The method for making an optical cladding of claim 1, wherein $n_1$ is about 2, $n_2$ is 1, and $n_3$ is about 2.

6. The method for making an optical cladding of claim 1, wherein $n_1$ is about 2, $n_2$ is 1, and $n_3$ is about 1.

7. The method for making an optical cladding of claim 1, wherein R is, independently at each occurrence, —$CH_3$, —$CH_2CH_3$, —$CH(CH_3)_2$, or —$O(CH_2)_n$—$CH_3$ where n is two or more.

8. The method for making an optical cladding of claim 1, wherein $R_1$ comprises an epoxy or an acrylate.

9. The method for making an optical cladding of claim 8, wherein $R_1$ comprises:

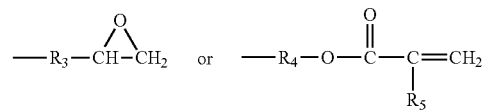

where $R_3$, $R_4$, and $R_5$ are alkyl or aromatic groups.

10. The method for making an optical cladding of claim 1, wherein $R_2$ comprises:
—F, —$CH_2$—$CH_2$—$CF_2$—$CF_2$—$CF_2$—$CF_2$—$CF_2$—$CF_2$—$CF_2$—$CF_2$—$CF_2$—$CF_3$, —$CH_2$—$CH_2$—$CF_2$—$CF_2$—$CF_2$—$CF_2$—$CF_2$—$CF_3$, or

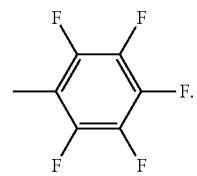

11. The method for making an optical cladding of claim 1, wherein gelling and crosslinking the monomer mixture forms an optical cladding layer comprising the structure

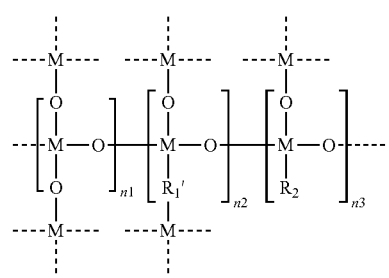

wherein $R_1'$ is an organic crosslinkage formed by the organic crosslinker $R_1$.

12. The method for making an optical cladding of claim 1, wherein gelling and crosslinking the monomer mixture forms an optical cladding layer comprising the structure

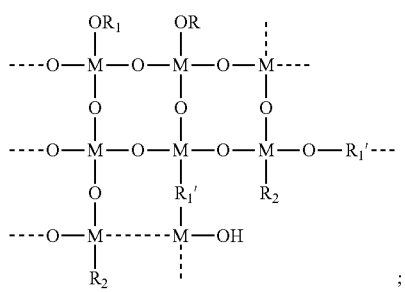

wherein R is a residual unhydrolised group, and
$R_1'$ is an organic crosslinkage formed by the organic crosslinker $R_1$.

13. The method for making an optical cladding of claim 1, wherein the monomer mixture further comprises 3% or less of a lithium salt.

14. The method for making an optical cladding of claim 1, wherein forming the monomer mixture includes adding the monomers sequentially or simultaneously to a solvent or adding the solvent to one or more of the monomers.

15. The method for making an optical cladding of claim 14, further comprising:
applying the monomer mixture or a partially gelled monomer mixture over a semiconductor, glass, or semiconductor-on-glass wafer;
wherein gelling and crosslinking the monomer mixture further comprises:
applying heat, spin drying, or vacuum evaporation to drive off at least a portion of the solvent; and
applying heat, ultraviolet radiation, or heat and ultraviolet radiation to perform, increase, or complete the crosslinking and gelling to form a mechanically tough, optically transparent optical cladding having a thickness between 10 nanometers and 100 micrometers.

16. The method for making an optical cladding of claim 15, wherein applying the monomer mixture or a partially gelled monomer mixture over a semiconductor, glass, or semiconductor-on-glass wafer includes spin coating, spraying, or dipping the monomer mixture or partially gelled monomer mixture over an electro-optic polymer.

17. The method for making an optical cladding of claim 15, further comprising:
filtering or centrifuging the monomer mixture or partially gelled monomer mixture to substantially prevent any nonhomogeneity from being applied to the wafer surface.

18. The method for making an optical cladding of claim 14, wherein the solvent includes water.

19. The method for making an optical cladding of claim 14, further comprising adding the monomer mixture to a catalyst or adding the catalyst to the monomer mixture.

20. An optical cladding formed from a monomer mixture comprising:

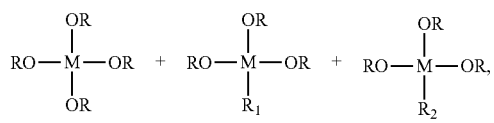

in the ratio $n_1:n_2:n_3$, respectively,
wherein:
M is Si, Ti, Al, Zr, or B,
R is a hydrolysable group,
$R_1$ is an organic crosslinker,
$R_2$ is a fluorinated organic group or fluorine, and
$n_1$, $n_2$, and $n_3$ are each between 1 and 10;
wherein the optical cladding is disposed adjacent to an optical core including a poled chromophore;
wherein the optical cladding does not contain the poled chromophore; and
wherein the optical cladding is configured to guide light at an infrared wavelength along the optical core.

21. The optical cladding of claim 20, wherein M is Si.

22. The optical cladding of claim 20, wherein $(n_1+n_2)>n_3$.

23. The optical cladding of claim 20, wherein $n_1$ is about 4, $n_2$ is 1, and $n_3$ is about 2.

24. The optical cladding of claim 20, wherein $n_1$ is about 2, $n_2$ is 1, and $n_3$ is about 2.

25. The optical cladding of claim 20, wherein $n_1$ is about 2, $n_2$ is 1, and $n_3$ is about 1.

26. The optical cladding of claim 20, wherein R is, independently at each occurrence, H, $-CH_3$, $-CH_2CH_3$, or $-CH(CH_3)_2$.

27. The optical cladding of claim 20, wherein $R_1$ comprises an epoxy or an acrylate.

28. The optical cladding of claim 20, wherein $R_1$ comprises:

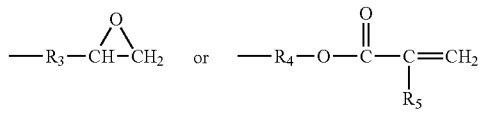

where $R_3$, $R_4$, and $R_5$ are alkyl or aromatic groups.

29. The optical cladding of claim 20, wherein $R_2$ comprises:
—F, $-CH_2-CH_2-CF_2-CF_2-CF_2-CF_2-CF_2-$
$CF_2-CF_2-CF_2-CF_2-CF_3$, $-CH_2-CH_2-CF_2-$
$CF_2-CF_2-CF_2-CF_2-CF_3$, or

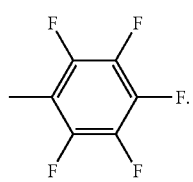

30. The optical cladding of claim 20, wherein gelling and crosslinking the monomer mixture forms an optical cladding layer comprising the structure

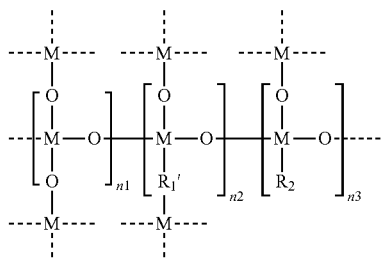

wherein $R_1'$ is an organic crosslinkage formed by the organic crosslinker $R_1$.

31. The optical cladding of claim 20, wherein gelling and crosslinking the monomer mixture forms an optical cladding layer comprising the structure $$\begin{array}{c}
\phantom{----}OR_1 \phantom{--} OR \\
----O—M—O—M—O—M---- \\
\phantom{----}| \phantom{---} | \phantom{---} | \\
\phantom{----}O \phantom{---} O \phantom{---} O \\
----O—M—O—M—O—M—O—R_1'--- \\
\phantom{----}| \phantom{---} | \phantom{---} | \\
\phantom{----}O \phantom{---} R_1' \phantom{-} R_2 \\
----O—M-------M—OH \\
\phantom{----}| \\
\phantom{----}R_2
\end{array}$$ ;

wherein R is a residual unreacted group, and
$R_1'$ is an organic crosslinkage formed by the organic crosslinker $R_1$.

32. The optical cladding of claim 20, further comprising 3% or less of a lithium salt.

33. The optical cladding of claim 20, wherein the optical cladding is formed over a semiconductor, glass, or semiconductor-on-glass wafer at a thickness between 10 nanometers and 100 micrometers.

34. The optical cladding of claim 33, wherein the optical cladding is formed over an electro-optic polymer.

35. An optical device including at least one optical cladding comprising the structure:

$$\begin{array}{c}
----M---- \phantom{--} ----M---- \phantom{--} ----M---- \\
| \phantom{----} | \phantom{----} | \\
\left[\begin{array}{c} O \\ | \\ ---M—O \\ | \\ O \end{array}\right]_{n1} \left[\begin{array}{c} O \\ | \\ M—O \\ | \\ R_1' \end{array}\right]_{n2} \left[\begin{array}{c} O \\ | \\ M—O \\ | \\ R_2 \end{array}\right]_{n3}---- \\
| \phantom{----} | \\
----M---- \phantom{--} ----M----
\end{array}$$ ;

wherein:
M is Si, Ti, Al, Zr, or B,
$R_1'$ is an organic crosslinkage,
$R_2$ is a fluorinated organic group or fluorine, and
$n_1$, $n_2$, and $n_3$ are each between 1 and 10; and
an optical core including a poled chromophore disposed adjacent to the optical cladding;
wherein the optical cladding does not include the poled chromophore.

36. The optical device of claim 35, wherein M is Si.

37. The optical device of claim 35, wherein $(n_1+n_2) > n_3$.

38. The optical device of claim 35, wherein $n_1$ is about 4, $n_2$ is 1, and $n_3$ is about 2.

39. The optical device of claim 35, wherein $n_1$ is about 2, $n_2$ is 1, and $n_3$ is about 2.

40. The optical device of claim 35, wherein $n_1$ is about 2, $n_2$ is 1, and $n_3$ is about 1.

41. The optical device of claim 35, wherein $R_1'$ comprises an epoxy or an acrylic crosslinkage.

42. The optical device of claim 35, wherein $R_2$ comprises:
—F, —$CH_2$—$CH_2$—$CF_2$—$CF_2$—$CF_2$—$CF_2$—$CF_2$—$CF_2$—$CF_2$—$CF_2$—$CF_2$—$CF_3$, —$CH_2$—$CH_2$—$CF_2$—$CF_2$—$CF_2$—$CF_2$—$CF_2$—$CF_3$, or $$\begin{array}{c}
F \phantom{--} F \\
\diagup\diagdown \\
| \phantom{--} |—F \\
\diagdown\diagup \\
F \phantom{--} F
\end{array}$$ .

43. The optical device of claim 35, wherein the structure forms a network $$\begin{array}{c}
\phantom{----}OR_1 \\
----O—M—O—M—O—M---- \\
\phantom{----}| \phantom{---} | \phantom{---} | \\
\phantom{----}O \phantom{---} O \phantom{---} O \\
----O—M—O—M—O—M—O—R_1'--- \\
\phantom{----}| \phantom{---} | \phantom{---} | \\
\phantom{----}O \phantom{---} R_1' \phantom{-} R_2 \\
----O—M-------M---- \\
\phantom{----}| \\
\phantom{----}R_2
\end{array}$$ ;

wherein
$R_1$ is an organic crosslinker, and
$R_1'$ is the organic crosslinkage formed by the organic crosslinker $R_1$.

44. The optical device of claim 35, wherein the optical cladding forms a portion of an optical polymer stack over a semiconductor, glass, or semiconductor-on-glass wafer.

45. The optical device of claim 44, wherein the optical cladding is formed over an electro-optic polymer, and wherein the optical cladding and the electro-optic polymer form portions of an optical polymer stack.

46. The optical device of claim 35, wherein the optical cladding has a thickness between 10 nanometers and 100 micrometers.

47. The optical device of claim 35, wherein the optical device includes a Mach-Zehnder modulator, a phase modulator, an optical multiplexer, and optical demultiplexer, or a ring modulator.

48. The optical device of claim 35, wherein:
the optical cladding includes a bottom cladding and a top cladding disposed under and over an electro-optic core, respectively;
the bottom cladding is about 1-2.0 microns thick under a trench waveguide;
the electro-optic core is about 3 microns thick at the trench waveguide; and
the top cladding is about 0.5 to 2.0 microns thick.

49. The optical device of claim 35, wherein:
the optical cladding includes a bottom cladding and a top cladding disposed under and over an electro-optic core, respectively;
the bottom cladding is about 2.0-3.0 microns thick;
the electro-optic core is about 3 microns thick; and
the top cladding is about 0.5 to 2.0 microns thick.

50. A method comprising:
(1) making an optical cladding by:
combining a silane monomer, an organically modified trialkoxysilane monomer including an organic crosslinking group, and a fluorinated silane monomer in a solvent to form a sol-gel solution;
hydrolyzing the sol-gel solution to begin a gelling reaction;

applying the sol-gel solution over a semiconductor, glass, or semiconductor-on-glass wafer; and removing excess solvent, gelling, and crosslinking the applied sol-gel solution to form at least one optical cladding having a thickness of about 2.0 to 3.0 microns; wherein the sol-gel solution does not contain a poled chromophore; and (2) applying to the optical cladding a polymer core layer including a poled chromophore.

51. The method of making the optical cladding of claim 50, wherein the silane monomer includes at least one selected from the group consisting of tetraalkoxysilane, alkyltrialkoxysilane, dialkyldialkoxysilane, alkyltrichlorosilane, dialkoxydisiloxane, and trialkoxydisiloxane.

52. The method of making the optical cladding of claim 50, wherein the organically modified trialkoxysilane monomer including an organic cross-linking group includes at least one selected from the group consisting of glycidoxypropyltrimethoxysilane, glycidoxypropyltriethoxysilane, epoxytrimethoxysilane, epoxytriethoxysilane, acryltrimethoxysilane, and acryltriethoxysilane.

53. The method of making the optical cladding of claim 50, wherein the fluorinated silane monomer includes at least one selected from the group consisting of tridecafluoro-1,1,2,2-tetrahydrooctyltriethoxysilane, tridecafluoro-1,1,2,2-tetrahydrooctyltrimethoxysilane, 1H,1H,2H,2H-perfluorododecyl-triethoxysilane, 1H,1H,2H,2H-perfluorododecyltrimethoxysilane, 1H,1H,2H,2H-perfluorotetradecyltriethoxysilane, 1H,1H,2H,2H-perfluorotetradecyltrimethoxysilane, pentafluorobenzyltriethoxysilane, pentafluorobenzyltrimethoxysilane, fluorotriethoxysilane, and fluorotrimethoxysilane.

54. The method of making the optical cladding of claim 50, wherein applying the combined monomers includes at least one of casting a thin film from sol-gel by spin coating, dipping, printing, or spraying.

55. The method of making the optical cladding of claim 54, wherein casting a thin film from sol-gel includes removing a majority of the solvent used for the sol-gel solution preparation.

56. The method of making the optical cladding of claim 50, wherein removing excess solvent includes performing spin drying, vacuum evaporation, heating, baking or a combination thereof.

57. The method of making the optical cladding of claim 50, wherein gelling and crosslinking the applied sol-gel solution comprises:

curing the applied sol-gel solution to produce a mechanically strong, stable film.

58. The method of making the optical cladding of claim 57, wherein curing the applied sol-gel solution transforms the sol-gel materials from a soluble state to a insoluble state.

59. The method of making the optical cladding of claim 50, wherein the index of refraction of the cured optical cladding is between about 1.35 and 1.44 at about 1550 nanometers wavelength.

60. The method of making the optical cladding of claim 59, wherein the index of refraction is between about 1.391 and 1.404 at 1550 nanometers wavelength.

\* \* \* \* \*